United States Patent
Wang et al.

(10) Patent No.: US 12,500,268 B2
(45) Date of Patent: Dec. 16, 2025

(54) NONAQUEOUS ELECTROLYTE ADDITIVE, NONAQUEOUS ELECTROLYTE CONTAINING SAME, POWER STORAGE DEVICE, AND ELECTRIC DEVICE

(71) Applicant: AESC Japan Ltd., Kanagawa (JP)

(72) Inventors: Renhe Wang, Shanghai (CN); Le Yu, Shanghai (CN); Weijun Zhao, Shanghai (CN)

(73) Assignee: AESC Japan Ltd., Kanagawa (JP)

( * ) Notice: Subject to any disclaimer, the term of this patent is extended or adjusted under 35 U.S.C. 154(b) by 511 days.

(21) Appl. No.: 18/012,989

(22) PCT Filed: Dec. 29, 2020

(86) PCT No.: PCT/CN2020/140548
§ 371 (c)(1),
(2) Date: Dec. 27, 2022

(87) PCT Pub. No.: WO2022/141010
PCT Pub. Date: Jul. 7, 2022

(65) Prior Publication Data
US 2023/0253622 A1    Aug. 10, 2023

(51) Int. Cl.
*H01M 10/0567*    (2010.01)
*H01M 10/0569*    (2010.01)

(52) U.S. Cl.
CPC ... *H01M 10/0567* (2013.01); *H01M 10/0569* (2013.01); *H01M 2300/004* (2013.01)

(58) Field of Classification Search
CPC .............................. C07D 327/10; C07D 497/10
See application file for complete search history.

(56) References Cited

U.S. PATENT DOCUMENTS

2015/0132664 A1* 5/2015 Kim .................. H01M 10/0567
                                                                     429/334

FOREIGN PATENT DOCUMENTS

| CN | 101847750 |   | 9/2010 | | |
|---|---|---|---|---|---|
| CN | 102074738 | A * | 5/2011 | | |
| CN | 103493277 |   | 1/2014 | | |
| CN | 105830271 |   | 8/2016 | | |
| CN | 107293784 |   | 10/2017 | | |
| EP | 3211706 |   | 8/2017 | | |
| EP | 3211706 | A1 * | 8/2017 | .......... | H01M 10/052 |
| JP | 2014232704 | A * | 12/2014 | | |
| WO | WO-2016063964 | A1 * | 4/2016 | .......... | H01M 10/052 |

OTHER PUBLICATIONS

"Search Report of Europe Counterpart Application", issued on Sep. 18, 2024, p. 1-p. 8.
"International Search Report (Form PCT/ISA/210) of PCT/CN2020/140548," mailed on Sep. 28, 2021, with English translation thereof, pp. 1-4.
"Written Opinion of the International Searching Authority (Form PCT/ISA/237) of PCT/CN2020/140548," mailed on Sep. 28, 2021, pp. 1-4.

* cited by examiner

*Primary Examiner* — Maria V Ewald
*Assistant Examiner* — Suhani Jitendra Patel
(74) *Attorney, Agent, or Firm* — JCIPRNET

(57) ABSTRACT

The invention relates to a compound represented by formula (I), a nonaqueous electrolyte additive containing same, a nonaqueous electrolyte and a power storage device, and the use thereof for the nonaqueous electrolyte additive.

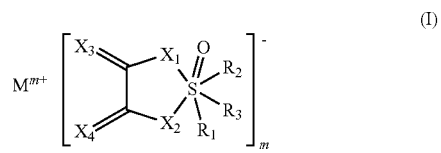

(I)

20 Claims, No Drawings

NONAQUEOUS ELECTROLYTE ADDITIVE, NONAQUEOUS ELECTROLYTE CONTAINING SAME, POWER STORAGE DEVICE, AND ELECTRIC DEVICE

CROSS-REFERENCE TO RELATED APPLICATION

This application is a 371 application of International PCT application serial no. PCT/CN2020/140548 filed on Dec. 29, 2020. The entirety of above mentioned patent application is hereby incorporated by reference herein and made a part of this specification.

BACKGROUND

Technical Field

The invention relates to the technical field of batteries, and particularly, to a sulfate compound, a nonaqueous electrolyte containing the same, and a power storage device.

Description of Related Art

In nonaqueous electrolyte secondary batteries, the electrolyte contains lithium salts, nonaqueous solvents and additives, and a small number of additives can specifically solve the technical problems such as short cycle life and safety hazards that are common in conventional lithium-ion batteries.

Currently, in nonaqueous electrolyte secondary batteries, vinylene carbonate (VC) is considered as the best film-forming additive, its reduction potential is higher than that of ethylene carbonate (EC), propylene carbonate (PC), and diethyl carbonate (DEC), etc., and the vinylene carbonate (VC) can be preferentially reduced on the carbon negative electrode. However, the VC is difficult to produce, the price is high, and the high temperature performance needs to be improved. Therefore, it is necessary to develop an electrolyte additive with a favorable performance, which can improve the film formation of the negative electrode, the high temperature performance of the battery, and the cycle stability of the battery as well.

The patent publication No. CN101847750A discloses a flame retardant electrolyte for a rechargeable lithium battery, which includes a lithium salt, a linear carbonate-based solvent, at least one ammonium cation, a phosphoric acid-based solvent, and an additive including oxalatoborate and has improved thermal stability, flame retardancy, and electrochemical properties such as high rate and cycle-life performance. The patent publication No. CN107293784A discloses an electrolyte and a lithium ion battery; the electrolyte includes a lithium salt, an organic solvent and an additive; the additive includes a silane phosphate compound and/or a silane borate compound; a fluorocarbon surfactant and an overcharge-prevention additive; and the high-temperature storage performance, the high-temperature cycle performance, the overcharge performance and the rate performance of the lithium ion battery can be improved. The patent publication No. CN105830271A discloses a phosphonoformic acid compound, a nonaqueous electrolyte including the compound, and an energy storage device, the nonaqueous electrolyte has the properties of maintaining high-load charging and discharging cycle at a high temperature, suppressing worsening of heat stability of a negative electrode and improving safety of an energy storage device. The patent publication No. CN103493277A discloses a trifluoromethylbenzene compound, a nonaqueous electrolyte including the compound, and an energy storage device, the nonaqueous electrolyte is capable of enhancing electrochemical characteristics in a temperature range.

SUMMARY

For one aspect, the invention provides a compound represented by formula (I).

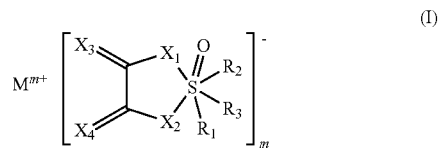

M is a counter cation;
m is an integer of 1 to 3;
$X_1$, $X_2$, $X_3$ and $X_4$ are each independently selected from oxygen and sulfur;
$R_1$ is selected from halogen, halogenated $C_{1-10}$ alkyl, and halogenated $C_{3-10}$ cycloalkyl;
$R_2$ and $R_3$ are each independently selected from halogen, halogenated $C_{1-10}$ alkyl, and halogenated $C_{3-10}$ cycloalkyl; or
$R_2$ and $R_3$ are each independently selected from oxygen or sulfur, and both $R_2$ and $R_3$ along with the atoms to which $R_2$ and $R_3$ are attached jointly form a moiety of formula (II),

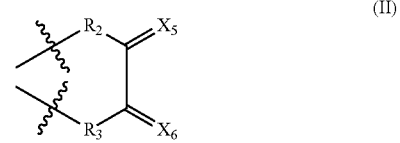

where $X_5$ and $X_6$ are each independently selected from oxygen or sulfur.

Preferably, in an embodiment, $X_1$, $X_2$, $X_3$ and $X_4$ are oxygen.

In one embodiment, the counter cation is a metal cation or a quaternary amine group.

Preferably, in an embodiment, the compound is selected from

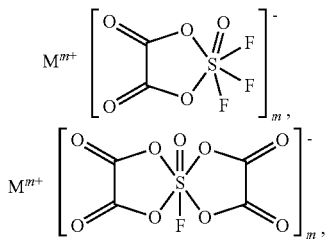

and a combination thereof, where M and m are as defined; specifically, $M^{m+}$ is a metal cation or a quaternary amine group,
m is an integer of 1-3.
More preferably, in an embodiment, the compound is selected from

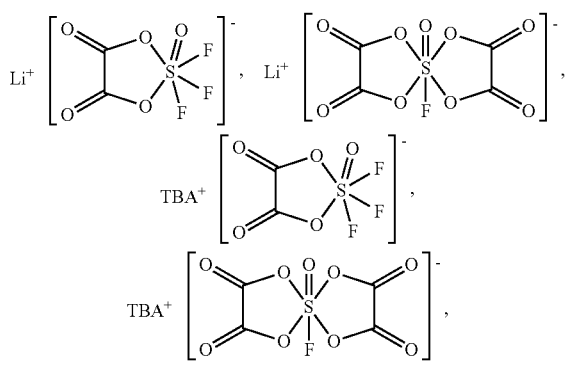

and a combination thereof.

For another aspect, the invention provides an additive for a nonaqueous electrolyte including the compound represented by formula (I) of the invention.

For yet another aspect, the invention provides a nonaqueous electrolyte comprising the compound represented by formula (I) and the additive for the nonaqueous electrolyte including the compound.

For another aspect, the invention provides a power storage device including the compound represented by formula (I) of the invention or the nonaqueous electrolyte of the invention.

For still another aspect, the invention provides the compound represented by formula (I) for a purpose of the additive for the nonaqueous electrolyte.

For another aspect, the invention provides an electric device including the power storage device of the invention.

DESCRIPTION OF THE EMBODIMENTS

The invention will be further described in detail below. Such descriptions are for illustration but not for limiting the invention. Other advantages and functions of the invention can be readily comprehended by those skilled in the art from the disclosure of this specification. The invention can also be implemented or applied in other different specific embodiments. Those skilled in the art can make various modifications and changes without departing from the spirit of the invention.

General Definitions and Terminology

All publications, patent applications, patents, and other references mentioned herein are incorporated by reference herein in their entirety and made a part of this specification, unless otherwise indicated.

Unless otherwise defined, all technical and scientific terms used herein have the same meaning as commonly understood by one of ordinary skill in the art to which this invention belongs. In case of conflict, the meanings of the terms shall refer to the definitions provided herein.

Percentages, parts, rates, and the like are all calculated by weight unless otherwise indicated.

When a certain amount, concentration, another value, or a parameter is expressed in terms of a range, a preferred range, or a preferred maximum number, and a preferred minimum number, it should be understood that any range by combining any pair of a maximum range or a preferred value with any minimum range or a preferred value is specifically disclosed, regardless of whether the range is specifically disclosed. Unless otherwise indicated, the numerical ranges recited herein are intended to include the endpoints of the range, and all integers and fractions within that range. The scope of the invention is not to be limited by the specific numerical values recited when defining the range. For example, "1-8" encompasses 1, 2, 3, 4, 5, 6, 7, 8, and any subrange consisting of any two values therein, such as 2-6, 3-5. In another example, $C_{1-10}$ alkyl represents an alkyl group having 1-10 carbon atoms, encompassing 1, 2, 3, 4, 5, 6, 7, 8, 9, 10, and any subgroup of any two values such as 1-8, 2-7, 3-6. In yet another example, $C_{3-10}$ cycloalkyl represents an alkyl group having 3-10 carbon atoms, encompassing 3, 4, 5, 6, 7, 8, 9, 10, and any subrange of any two values, such as 3-8, 4-7, 5-6.

Percentages, parts, rates, and the like are all calculated by weight unless otherwise indicated.

When used in conjunction with a numerical variable, terms "about" and "approximately" generally mean that the numerical value of that variable and all numerical values of that variable are within experimental error (e.g., within a 95% confidence interval for the mean), within ±10% of the specified numerical value. %, or within a wider range.

The terms "comprising", "including", "having", "containing" or "involving" and other variations thereof herein are inclusive or open-ended and do not exclude other unrecited elements or method steps. It should be understood by those skilled in the art that the above-mentioned terms such as "comprising" encompass the meaning of "consisting of". The expression "consisting of" excludes any element, step or ingredient not specified. The expression "consisting essentially of" means that the scope is limited to the specified elements, steps or components, plus optional elements, steps or components that do not substantially affect the basic and novel characteristics of the claimed subject matter. It should be understood that the expression "comprising" encompasses the expressions "consisting essentially of" and "consisting of".

The term "selected from . . . " refers to one or more elements of a listed group that follows the term. The one or more elements are selected independently and may include a combination of two elements or more.

As used herein, the terms "optional" or "optionally" mean that the subsequent described event or circumstance may or may not occur, and that the description includes the occurrence and non-occurrence of the event or circumstance.

When numerical values or range endpoints are described herein, it should be understood that the disclosed content includes the particular value or endpoint recited.

As used herein, the terms "one or more" or "at least one" refer to one, two, three, four, five, six, seven, eight, nine or more.

Unless otherwise specified, the terms "a combination thereof" and "a mixture thereof" refer to a multi-component mixture of the elements mentioned, such as two, three, four and up to the maximum extent of the multi-component mixture.

The terms "halo" or "halogen" or "halogenated" are to be interpreted as fluorine (F), chlorine (Cl), bromine (Br) or iodine (I) atoms, preferably fluorine, chlorine, bromine atoms.

The term "alkyl" refers to a straight or branched chain saturated aliphatic hydrocarbon group consisting of carbon and hydrogen atoms attached to the rest of the molecule by a single bond. "Alkyl" may have 1-10 carbon atoms, i.e. "$C_1$-$C_{10}$ alkyl", such as $C_1$-$C_4$ alkyl, $C_1$-$C_3$ alkyl, $C_1$-$C_2$ alkyl, $C_3$ alkyl, $C_4$ alkyl, $C_3$-$C_6$ alkyl. Non-limiting examples of alkyl groups include, but are not limited to, methyl, ethyl, propyl, butyl, pentyl, hexyl, isopropyl, isobutyl, sec-butyl, tert-butyl, isopentyl, 2-methylbutyl, 1-methylbutyl, 1-ethylpropyl, 1,2-dimethylpropyl, neopentyl, 1,1-dimethylpropyl, 4-methylpentyl, 3-methylpentyl, 2-methylpentyl, 1-methylpentyl, 2-ethylbutyl, 1-ethylbutyl, 3,3-dimethylbutyl, 2,2-dimethylbutyl, 1,1-dimethylbutyl, 2,3-dimethylbutyl, 1,3-dimethylbutyl or 1,2-dimethylbutyl, or their isomers. "Subunit" refers to a group obtained by removing a hydrogen atom from a carbon atom containing a free valence electron and having two attachment sites to the rest of the molecule. For example, "alkylene" or "alkylidene" refers to a saturated linear or branched divalent hydrocarbon radical. Examples of "alkylene" include, but are not limited to, methylene (—$CH_2$—), ethylene (—$C_2H_4$—), propylene (—$C_3H_6$—), butylene (—$C_4H_8$—), pentylene (—$C_5H_{10}$—), hexylene (—$C_6H_{12}$—), 1-methylethylene (—$CH(CH_3)CH_2$—), 2-methylethylene (—$CH_2CH(CH_3)$—), methyl propylene, or ethyl propylene and so on.

The term "cycloalkyl", as used herein, alone or in combination with other groups, refers to a saturated non-aromatic monocyclic or polycyclic (e.g., bicyclic) hydrocarbon ring (e.g., monocyclic, such as cyclopropyl, cyclobutyl, cyclopentyl, cyclohexyl, cycloheptyl, cyclooctyl, cyclononyl; or bicyclic, including spiro, fused, or bridged systems (e.g., bicyclo[1.1.1]pentyl, bicyclo[2.2.1]heptyl, bicyclo [3.2.1]octyl or bicyclo[5.2.0]nonyl, decahydronaphthalene, and the like). For example, the term "$C_{3-10}$ cycloalkyl" refers to a cycloalkyl having 3-10 ring carbon atoms (e.g., 3, 4, 5, 6, 7, 8, 9, or 10).

The compounds of the invention may be in the form of anions, forming salts of the compounds of the invention with cations. The cations include, but are not limited to, metal cations, ammonium ions, quaternary amine groups.

The term "counterion" refers to a species having an opposite charge to the compounds of the application, which can be a charged ion, such as a metal cation or ammonium ion, or a charged group, such as a quaternary amine group.

The term "chain ester" refers to ester compounds with a straight chain structure, and examples thereof include, but are not limited to, methyl formate, ethyl formate, methyl acetate, ethyl acetate, methyl propionate, ethyl propionate, methyl butyrate, ethyl butyrate, ethyl methyl carbonate, methyl propyl carbonate, dimethyl carbonate, diethyl carbonate, ethylpropyl carbonate, dipropyl carbonate, and the like.

The term "cyclic ester" refers to an ester compound having a cyclic structure, and examples include, but are not limited to, ethylene carbonate, propylene carbonate, 1,2-Butylene carbonate, 2,3-Butylene carbonate, 4-Fluoro-1,3-dioxolane-2-one, trans or cis 4,5-difluoro-1,3-dioxolane-2-one, fluoroethylene carbonate, vinylene carbonate, vinyl ethylene carbonate, propylene carbonate, ethylene carbonate, butylene carbonate.

The term "electrolyte" is a medium used by chemical batteries, electrolytic capacitors, and the like, which can provide ions for the normal operation of chemical batteries, electrolytic capacitors, and the like.

The term "non-aqueous electrolyte" refers to an electrolyte using a nonaqueous solvent.

The term "electrolyte salt" refers to an ionic salt that is at least partially soluble in the solvent of the electrolyte composition and at least partially dissociated into ions in the solvent of the electrolyte composition to form a conductive electrolyte composition. Lithium salts are preferably used as electrolyte salts.

The term "anode" refers to the electrode of an electrochemical cell in which oxidation occurs. In primary cells, such as batteries, the anode is the negatively charged electrode. In secondary batteries (i.e., rechargeable batteries), the anode is the electrode in which oxidation occurs during discharge and reduction occurs during charge.

The term "cathode" refers to the electrode of an electrochemical cell where reduction occurs. In primary cells, such as batteries, the cathode is the positively charged electrode. In secondary batteries (i.e., rechargeable batteries), the cathode is the electrode in which reduction occurs during discharge and oxidation occurs during charge.

The term "lithium ion battery" refers to a type of rechargeable battery in which lithium ions move from anode to cathode during discharge and from cathode to anode during charge.

The term "secondary battery" refers to an electrochemical cell in which the electrochemical reaction is reversible and also refers to a cell that can be recharged or rechargeable for a battery which is used by repeatedly charging and discharging over its service life.

The term "chemical formation" refers to the process of charging and discharging the battery with a small current after the battery is obtained during the battery preparation process. The chemical formation treatment contributes to stabilizing the electrical properties of the battery.

The term "aging" refers to the operation in which the battery stands at a certain temperature for a period of time after the battery is assembled and filled with liquid and undergoes the first chemical treatment during the battery preparation process. The aging treatment of the battery contributes to reorganizing the SEI structure to form a loose and porous film, which allows the battery to perform stably.

The term "SEI" or "SEI film" refers to a passivation layer covering the surface of the electrode material is formed when the reaction between the electrode material and the electrolyte occurs at the solid-liquid interface during the first charge and discharge of the battery.

The term "mobile vehicle" refers to a vehicle powered by electricity, and examples of the mobile vehicle include, but are not limited to, an electric vehicle (EV), a hybrid electric vehicle (HEV), a plug-in hybrid electric vehicle (PHEV), and the like.

The term "electric two-wheeled vehicle" refers to a two-wheeled vehicle powered by electricity, and examples of an electric two-wheeled vehicle include, but are not limited to, E-bikes and E-scooters.

Compound Represented by Formula (I)

For one aspect, the invention provides a compound represented by formula (I):

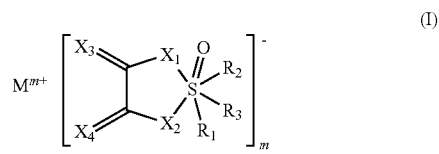

It is characterized by that M is a counter cation; m is an integer of 1 to 3; $X_1$, $X_2$, $X_3$ and $X_4$ are each independently selected from the group consisting of oxygen and sulfur; $R_1$ is selected from the group consisting of halogen, halogenated $C_{1-10}$ alkyl, and halogenated $C_{3-10}$ cycloalkyl; $R_2$ and $R_3$ are each independently selected from the group consisting of halogen, halogenated $C_{1-10}$ alkyl, and halogenated $C_{3-10}$ cycloalkyl; or $R_2$ and $R_3$ are each independently selected from the group consisting of oxygen or sulfur, and both $R_2$ and $R_3$ along with the atoms to which they are attached jointly form a moiety of formula (II).

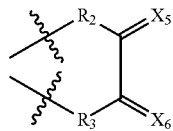
(II)

$X_5$ and $X_6$ are each independently selected from the group consisting of oxygen or sulfur.

Preferably, in an embodiment, the $X_1$, $X_2$, $X_3$ and $X_4$ are oxygen.

Preferably, in an embodiment, $R_1$ is selected from halogen. More preferably, in an embodiment, $R_1$ is selected from the group consisting of fluorine, chlorine and bromine. In a specific preferred embodiment, $R_1$ is fluorine.

In another embodiment, $R_2$ and $R_3$ are each independently selected from halogen. More preferably, in an embodiment, $R_2$ and $R_3$ are each independently selected from the group consisting of fluorine, chlorine and bromine. In a specific preferred embodiment, $R_2$ and $R_3$ are each independently fluorine.

In yet another preferred embodiment, $R_2$ and $R_3$ are each independently oxygen, and both $R_2$ and $R_3$ along with the atoms to which they are attached jointly form a moiety of formula (II). More preferably, in an embodiment, $R_2$ and $R_3$ are each independently oxygen, and both $R_2$ and $R_3$ along with the atoms to which they are attached jointly form a moiety of formula (II), where $X_5$ and $X_6$ are each independently oxygen.

In a specific embodiment, $R_1$ is fluorine, and $R_2$ and $R_3$ are each independently fluorine. In another specific embodiment, $R_1$ is fluorine, $R_2$ and $R_3$ are each independently oxygen, and both $R_2$ and $R_3$ along with the atoms to which they are attached jointly form a moiety of formula (II), where $X_5$ and $X_6$ are each independently oxygen.

According to the valence state of the counter cation $M^{m+}$, m corresponds to an integer of 1-3. For example, when the counter cation $M^{m+}$ is a lithium ion ($Li^+$), m corresponds to 1, and R is a substituent as defined. For another example, when the counter cation $M_{m+}$ is calcium ion ($Ca^{2+}$), m corresponds to 2. For another example, when the counter cation $M^{m+}$ is a quaternary amine group, m corresponds to 1.

Preferably, in an embodiment, the compound is selected from

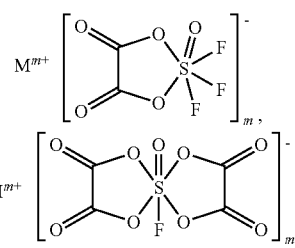

and a combination thereof, where M and m are as defined; specifically, $M^{m+}$ is a metal cation or a quaternary amine group as described, and m is an integer of 1-3.

More preferably, in an embodiment, the compound is selected from

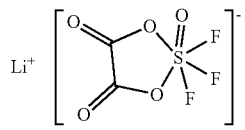

(herein also expressed as $LiSF_3C_2O_5$),

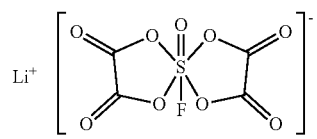

(herein also expressed as $LiSFC_4O_9$),

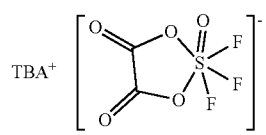

(herein also expressed as $TBASF_3C_2O_5$),

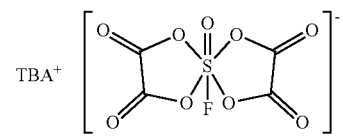

(herein also expressed as $TBASFC_4O_9$), and a combination thereof.

Herein, $TBA^+$ is expressed as the quaternary amine group tetrabutylamine, i.e.,

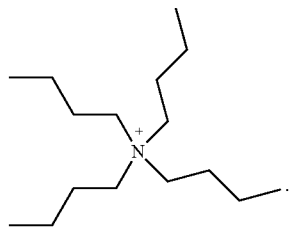

Therefore,

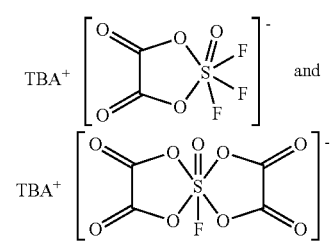

can be expressed as

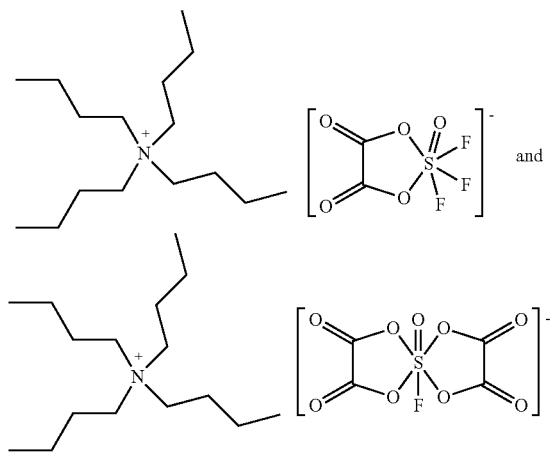

Counter Cation

Counter cations in the compound herein include, but are not limited to, metal cations, ammonium ions, quaternary amine groups, and the like.

Preferably, in an embodiment, the counter cation is a metal cation or a quaternary amine group.

More preferably, in an embodiment, the counter cation is a metal cation. Metal cations may include alkali metal cations, alkaline earth metal cations, transition metal cations, and the like. Preferably, in an embodiment, the metal cation contained in the compound represented by formula (I) is an alkali metal cation or an alkaline earth metal cation. More preferably, in an embodiment, the metal cation contained in the compound represented by formula (I) is selected from the group consisting of lithium ion, sodium ion, potassium ion, calcium ion, magnesium ion, and a combination thereof. In a specific preferred embodiment, the metal cation contained in the compound represented by formula (I) is a lithium ion.

In another much preferred embodiment, the counter cation is a quaternary amine group. Preferably, in an embodiment, the quaternary amine group contained in the compound represented by formula (I) is selected from the group consisting of tetramethylamine, tetraethylamine, tetrapropylamine, and tetrabutylamine. More preferably, in an embodiment, the quaternary amine group contained in the compound represented by formula (I) is tetrabutylamine.

Additive for the Nonaqueous Electrolyte

For another aspect, the invention provides an additive for a nonaqueous electrolyte, characterized by containing the compound represented by formula (I).

The Nonaqueous Electrolyte Containing the Compound Represented by Formula (I)

For another aspect, the invention provides a nonaqueous electrolyte including the compound represented by formula (I) of the invention. The nonaqueous electrolyte of the invention may contain one or more compounds of formula (I) of the invention. That is, one compound represented by formula (I) may be used, or a mixture of one or more compounds of formula (I) may be used, or a combination of compounds of formula (I) may be used.

As an additive in the nonaqueous electrolyte, the compound represented by formula (I) can be reduced to form a film at the negative electrode, passivate the surface of the electrode, and allow lithium ions to freely enter and exit the electrode while solvent molecules cannot pass through, and thus the destruction of the electrode by the co-insertion of solvent molecules is prevented, and performance such as the cycle efficiency and reversible capacity of the battery containing the nonaqueous electrolyte is improved. In addition, the compound represented by formula (I) has a high reduction voltage, can be preferentially reduced to a film at the negative electrode, improves the high temperature performance of the battery containing the nonaqueous electrolyte, and improves the cycle stability of the battery.

In one embodiment, the content of the compound represented by formula (I) in the nonaqueous electrolyte is about 0.1 to 10 wt % based on the total weight of the nonaqueous electrolyte. Preferably, in an embodiment, the content of the compound represented by formula (I) in the nonaqueous electrolyte is about 0.2 to 6 wt % based on the total weight of the nonaqueous electrolyte. More preferably, in an embodiment, the content of the compound represented by formula (I) in the nonaqueous electrolyte is about 1 wt % based on the total weight of the nonaqueous electrolyte. For example, about 0.1 wt %, about 0.2 wt %, about 0.3 wt %, about 0.5 wt %, about 0.8 wt %, about 1 wt %, about 1.5 wt %, about 2 wt %, about 3 wt %, about 4 wt %, about 5 wt %, about 6 wt %, about 7 wt %, about 8 wt %, about 8.5 wt %, about 9 wt %, or about 10 wt %. When the content of the compound represented by formula (I) is excessively low, the cycle life of the battery containing the nonaqueous electrolyte cannot be effectively improved. When the content of the compound represented by formula (I) is too high, and the battery containing the nonaqueous electrolyte is operated at high temperature, excess gas is generated, resulting in the problem of a swollen battery.

Nonaqueous Solvent

In one embodiment, the nonaqueous electrolyte may contain a nonaqueous solvent. Examples of nonaqueous solvents that can be used include, but are not limited to, cyclic esters, chain esters, ethers, amides, phosphate esters, sulfones, nitriles, compounds containing S=O bond, and the like.

Preferably, in an embodiment, in the nonaqueous electrolyte of the invention, the nonaqueous solvent used is selected from the group consisting of cyclic esters, chain esters, and a combination thereof.

Cyclic Carbonate

Cyclic esters include, but are not limited to, cyclic carbonates, lactones. Preferably, in an embodiment, in the nonaqueous electrolyte of the invention, the nonaqueous solvent used is a cyclic carbonate.

Examples of cyclic carbonates include, but are not limited to, ethylene carbonate (EC), propylene carbonate (PC), butylene carbonate (BC), fluoroethylene carbonate (FEC), vinylene carbonate (VC), 1,2-butene carbonate, 2,3-butene carbonate, vinylene carbonate, vinyl ethylene carbonate (VEC), trans or cis 4,5-difluoro-1,3-dioxolane-2-one (both collectively referred to as "DFEC"), 4-ethynyl-1,3-dioxolane-2-one (EEC), and the like.

Preferably, in an embodiment, in the nonaqueous electrolyte of the invention, the nonaqueous solvent used is selected from the group consisting of ethylene carbonate, propylene carbonate, 1,2-butene carbonate, and a combination thereof. More preferably, in an embodiment, in the nonaqueous electrolyte of the invention, the nonaqueous solvent used is ethylene carbonate.

In another preferred embodiment, in the nonaqueous electrolyte of the invention, the nonaqueous solvent used is a cyclic carbonate containing unsaturated bonds such as carbon-carbon double bonds or carbon-carbon triple bonds. More preferably, in an embodiment, in the nonaqueous electrolyte of the invention, the nonaqueous solvent used is selected from the group consisting of vinylene carbonate, vinylethylene carbonate, 4-ethynyl-1,3-dioxa Cyclopentan-2-ones, and a combination thereof. In a specific preferred embodiment, in the nonaqueous electrolyte of the invention, the nonaqueous solvent used is vinylene carbonate.

In yet another preferred embodiment, in the nonaqueous electrolyte of the invention, the nonaqueous electrolyte used is a cyclic carbonate containing a fluorine atom. More preferably, in an embodiment, in the nonaqueous electrolyte of the invention, the nonaqueous electrolyte used is selected from the group consisting of fluoroethylene carbonate, trans or cis 4,5-difluoro-1,3-di oxolan-2-one and a combination thereof.

The nonaqueous solvent with a suitable content of the cyclic carbonate containing unsaturated bonds contributes to improving the low temperature and high temperature characteristics of a battery containing the nonaqueous electrolyte and improving the load characteristics after high-temperature charge storage. An excessive content of the cyclic carbonate containing unsaturated bonds may increase the viscosity of the electrolyte and reduce the charge transfer efficiency in the battery and the efficiency of the battery. A too low content of the cyclic carbonate containing unsaturated bonds may reduce the conductivity of the battery and reduce the efficiency of the battery.

The nonaqueous solvent with a suitable content of the cyclic carbonate containing fluorine atoms contributes to improving the low temperature and high temperature characteristics of a battery containing the nonaqueous electrolyte and improving the load characteristics after high-temperature charge storage. An excessive content of the cyclic carbonate containing fluorine atoms may increase the viscosity of the electrolyte and reduce the charge transfer efficiency in the battery and the efficiency of the battery. A too low content of the cyclic carbonate containing fluorine atoms may reduce the conductivity of the battery and reduce the efficiency of the battery.

In some embodiments, the nonaqueous solvent is a single cyclic carbonate solvent.

In other embodiments, the nonaqueous solvent is a mixed solvent. Preferably, in an embodiment, the nonaqueous solvent contains two or more cyclic carbonate solvents. When a mixed solvent is used, the electrochemical performance of the battery containing such a nonaqueous electrolyte at high temperature can be further improved. In another preferred embodiment, the nonaqueous solvent contains three or more cyclic carbonate solvents. A combination of mixed cyclic carbonates includes, but are not limited to, cyclic carbonates and cyclic carbonates containing unsaturated bonds; cyclic carbonates and cyclic carbonates containing fluorine atoms; and cyclic carbonates containing unsaturated bonds and cyclic carbonates containing fluorine atoms; or cyclic carbonates, cyclic carbonates containing unsaturated bonds, and cyclic carbonate containing fluorine atoms, and the like. The selection of the cyclic carbonate, the cyclic carbonate containing unsaturated bonds, and the cyclic carbonate containing fluorine atoms is as illustrated in the forgoing paragraphs.

Chain Carbonate

Chain esters include, but are not limited to, chain carbonates, chain sulfonates. Preferably, in an embodiment, in the nonaqueous electrolyte of the invention, the nonaqueous solvent used is a chain carbonate.

Examples of the chain carbonates include, but are not limited to, ethyl methyl carbonate (EMC), methyl propyl carbonate, dimethyl carbonate (DMC), diethyl carbonate (DEC), ethyl propyl carbonate, dipropyl carbonate, and the like.

Preferably, in an embodiment, in the nonaqueous electrolyte of the invention, the nonaqueous electrolyte used is preferably selected from ethyl methyl carbonate, dimethyl carbonate, diethyl carbonate, ethylpropyl carbonate, dipropyl carbonate, and a combination thereof. More preferably, in an embodiment, in the nonaqueous electrolyte of the invention, the nonaqueous electrolyte used is preferably selected from ethyl methyl carbonate, dimethyl carbonate, diethyl carbonate, and a combination thereof.

For the battery containing the nonaqueous electrolyte, a suitable content of the chain carbonates contributes to obtaining good battery performance. An excessive content of the chain carbonates may reduce the conductivity of the battery and reduce the efficiency of the battery. A too low content of the chain carbonates may increase the viscosity of the electrolyte, reduce the charge transfer efficiency in the battery and the efficiency of the battery.

In some embodiments, the nonaqueous solvent is a single chain carbonate solvent.

In other embodiments, the nonaqueous solvent is a mixed solvent. Preferably, in an embodiment, the nonaqueous solvent contains two or more chain carbonate solvents. When a mixed solvent is used, the electrochemical performance of the battery containing such a nonaqueous electrolyte at high temperature can be further improved. In another preferred embodiment, the nonaqueous solvent contains three or more chain carbonate solvents. When the nonaqueous solvent of the nonaqueous electrolyte is a mixture of chain carbonates, the selection of the nonaqueous solvent is as illustrated in the foregoing paragraphs.

Other Solvents

Lactone

In one embodiment, the lactone as the nonaqueous solvent is selected from the group consisting of γ-butyrolactone, γ-valerolactone, α-angelica lactone, and a combination thereof Ether In one embodiment, the ether as the nonaqueous solvent is selected from tetrahydrofuran, 2-methyltetrahydrofuran, 1,3-dioxolane, cyclic ethers such as 1,3-dioxane and 1,4-dioxane, 1,2-dimethoxyethane, 1,2-diethoxyethane, 1,2-dibutoxyethane, and a combination thereof Amide In one embodiment, the amide as the nonaqueous solvent is dimethylformamide.

Phosphate Ester

In one embodiment, the phosphate ester as the nonaqueous solvent is selected from the group consisting of trimethyl phosphate, tributyl phosphate, trioctyl phosphate, and a combination thereof.

Nitrile

In one embodiment, the nitrile as the nonaqueous solvent is selected from the group consisting of acetonitrile, propionitrile, succinonitrile, glutaronitrile or adiponitrile, pimeliconitrile, and a combination thereof.

Compound Containing S=O Bonds

In one embodiment, the compound containing S=O bond as the nonaqueous solvent is selected from the group consisting of sultone compounds such as 1,3-propane sultone, 1,3-butane sultone and 1,4-butane sultone, ethylene sulfite, hexahydrobenzo[1,3,2]dioxolane-2-oxide (also referred to 1,2-cyclohexanediol cyclic sulfite), cyclic sulfite compounds such as 5-vinyl-hexahydro-1,3,2-benzodioxythiol-2-oxide, and the like, 1,2-ethylene glycol dimethanesulfonate, 1,2- propanediol dimethanesulfonate, 1,3-propanediol dimethanesulfonate, 1,4-butanediol dimethanesulfonate, 1,5-pentanediol dimethanesulfonate, sulfonate compounds such as 2-propynyl methanesulfonate and methylene methane disulfonate, divinylsulfone, 1,2-bis(vinylsulfonyl)ethane, bis (2-vinylsulfonylethyl), and a combination thereof.

To achieve appropriate physical properties, the nonaqueous solvents may be used in combination. The nonaqueous solvent used in combination is selected from cyclic carbonate, chain carbonate, ether, amide, phosphate ester, sulfone, nitrile, and compound containing S=O bond. The selection of cyclic carbonate, chain carbonate, ether, amide, phosphate ester, sulfone, nitrile, and compound containing S=O bond is as illustrated in the foregoing paragraphs.

Preferably, in an embodiment, in the nonaqueous electrolyte of the invention, the nonaqueous solvent used is a combination of cyclic carbonate and chain carbonate, where the selection of cyclic carbonate and chain carbonate is as illustrated in the foregoing paragraphs. Such a combination can improve low-temperature and high-temperature cycle characteristics and load characteristics after high-temperature charge storage for the battery containing the nonaqueous electrolyte.

For battery containing the nonaqueous electrolyte, a suitable mass ratio of cyclic carbonate to chain carbonate contributes to obtaining good battery performance. Preferably, in an embodiment, in the nonaqueous electrolyte of the invention, the mass ratio of the cyclic carbonate solvent to the chain carbonate solvent is 3:7. An excessively high mass ratio of the cyclic carbonate solvent to the chain carbonate solvent may increase the viscosity of the electrolyte and reduce the charge transfer efficiency in the battery containing the nonaqueous electrolyte and the efficiency of the battery. An excessively low mass ratio of the cyclic carbonate solvent to the chain carbonate solvent may reduce the electrical conductivity of the battery and the efficiency of the battery.

In a specific embodiment, in the nonaqueous electrolyte of the invention, the nonaqueous solvent used is ethylene carbonate, ethyl methyl carbonate and diethyl carbonate. Preferably, in an embodiment, in the nonaqueous electrolyte of the invention, the nonaqueous solvent used is ethylene carbonate, ethyl methyl carbonate and diethyl carbonate, and the mass ratio thereof is 3:4:3-3:6:1. More preferably, in an embodiment, in the nonaqueous electrolyte of the invention, the nonaqueous solvent used is ethylene carbonate, ethyl methyl carbonate and diethyl carbonate, and the mass ratio thereof is 3:5:2.

Electrolyte Salt

The electrolyte salt refers to an ionic salt that is at least partially soluble in the solvent of the electrolyte composition and at least partially dissociated into ions in the solvent of the electrolyte composition to form a conductive electrolyte composition.

In one embodiment, in the nonaqueous electrolyte of the invention, a lithium salt or an onium salt is used as the electrolyte salt. More preferably, in an embodiment, in the nonaqueous electrolyte of the invention, the lithium salt is used as the electrolyte salt.

Lithium Salt

The lithium salt refers to salts having lithium as a cation. During the working process of the battery, the lithium ions of the electrolyte lithium salt play the role of transporting ions between the positive and negative electrodes of the battery, which is crucial to the performance of the battery. In addition, the type, purity, and content of the electrolyte lithium salt in the battery as well as the combination of the lithium salt and other substances can affect the capacity, charge-discharge performance, lifespan, and safety of the battery to varying degrees.

In the nonaqueous electrolyte of the invention, the used lithium salt includes a first lithium salt and a second lithium salt. The first lithium salt is an inorganic lithium salt, and the second lithium salt is a lithium salt containing an organic group.

The First Lithium Salt

In one embodiment, in the nonaqueous electrolyte of the invention, the first lithium salt used is selected from $LiPF_6$, $LiBF_4$, $LiBCl_4$, $LiAsF_6$, $LiClO_4$, $LiAlO_2$, LiCl, LiI, $LiSbF_6$, and a combination thereof. Preferably, in an embodiment, in the nonaqueous electrolyte of the invention, the first lithium salt used is selected from $LiPF_6$, $LiBF_4$ and a combination thereof.

The first lithium salt usually has good ionization ability, and it is easy to ionize in the solvent, so as to obtain a large amount of free lithium ions. Thus, a suitable first lithium salt can contribute to providing a sufficient content of lithium ions for the nonaqueous electrolyte and improve the conductivity of the nonaqueous electrolyte. In one embodiment, the content of the first lithium salt is about 8-16 wt %. Preferably, in an embodiment, the content of the first lithium salt is about 10-15 wt %. More preferably, in an embodiment, the content of the first lithium salt is about 13.5-14.5 wt %. For example, about 8 wt %, about 8.5 wt %, about 9 wt %, about 9.5 wt %, about 10 wt %, about 10.5 wt %, about 11 wt %, about 11.5 wt %, about 12 wt %, about 12.5 wt %, about 13 wt %, about 13.5 wt %, about 13.9 wt %, about 14 wt %, 14.1 wt %, about 14.5 wt %, about 15 wt %, about 15.5 wt %, about 16 wt %. An excessive content of the first lithium salt may increase the viscosity of the nonaqueous electrolyte, reduce the charge transfer efficiency in the battery containing the nonaqueous electrolyte, and thereby reduce the efficiency of the battery.

The Second Lithium Salt

In one embodiment, in the nonaqueous electrolyte of the invention, the second lithium salt used is selected from the group consisting of a lithium salt containing a P=O structure, a lithium salt containing a —S(=O)$_2$— structure, a lithium salt containing boron oxalate complex as anions and a combination thereof.

The lithium salt containing a P=O structure include, but are not limited to, lithium difluorophosphate ($LiPO_2F_2$), lithium monofluorophosphate ($Li_2PO_3F$), and the like.

The lithium salt containing a —S(=O)$_2$— structure include, but are not limited to, the lithium salt containing a —S(=O)$_2$O structure, the lithium salt containing a —S(=O)$_2$—N$^-$—S(=O)$_2$— structure, and the like. Preferably, in an embodiment, the lithium salt containing a —S(=O)$_2$— structure is a lithium salt containing the —S(=O)$_2$—N$^-$—S(=O)$_2$— structure. More preferably, in an embodiment, the lithium salt containing —S(=O)$_2$—N$^-$—S(=O)$_2$— structure is selected from lithium bisfluorosulfonimide (LiFSI), bis(trifluoromethane) sulfonyl) lithium amide (LiTFSI), and the like.

The lithium salts containing boron oxalate complex as anions include, but are not limited to, lithium bis-oxalate difluorophosphate (LiODFP), lithium difluorooxalate borate (LiODFB), lithium borate (LiBOB), and the like.

Preferably, in an embodiment, in the nonaqueous electrolyte of the invention, the second lithium salt used is selected from $LiPO_2F_2$, $Li_2PO_3F$, LiODFB, LiODFP, LiBOB, LiTFSI, LiFSI and a combination thereof. More preferably, in an embodiment, in the nonaqueous electrolyte of the invention, the second lithium salt used is selected from $LiPO_2F_2$, LiODFB, LiODFP, LiBOB, LiTFSI, LiFSI and a combination thereof.

A suitable second lithium salt can also participate in electrode film formation while providing a small amount of lithium ions, which contributes to improving the performance of the battery containing the nonaqueous electrolyte. In one embodiment, the content of the second lithium salt is about 0.5-5 wt %. Preferably, in an embodiment, the content of the second lithium salt is about 1.5-4 wt %. More preferably, in an embodiment, the content of the second lithium salt is about 1.9-3.6 wt %. For example, about 0.5 wt %, about 0.8 wt %, about 1 wt %, about 1.5 wt %, about 1.9 wt %, about 2 wt %, about 2.3 wt %, about 2.5 wt %, about 2.8 wt %, about 3 wt %, about 3.3 wt %, about 3.5 wt %, about 3.6 wt %, about 4 wt %, about 4.5 wt %, about 5 wt %. An excessive content of the second lithium salt may increase the viscosity of the electrolyte and reduce the charge transfer efficiency in the battery and the efficiency of the battery. A too low content of the second lithium salt cannot function to improve the performance of the battery containing the nonaqueous electrolyte. In one embodiment, in the nonaqueous electrolyte of the invention, the combination of the first lithium salt and the second lithium salt is used as the electrolyte lithium salt. Such a combination contributes to improving the thermal stability of the negative electrode of the battery and the permeability of lithium ions.

A suitable total content of the first lithium salt and the second lithium salt contributes to the interaction between the lithium salt and other additives to achieve the effect of reducing impedance and suppressing gas generation and contributes to improving electrode film formation as well. In one embodiment, in the nonaqueous electrolyte of the invention, the total content of the first lithium salt and the second lithium salt is about 10-20 wt %. Preferably, in an embodiment, in the nonaqueous electrolyte of the invention, the total content of the first lithium salt and the second lithium salt is about 11-17.6 wt %. More preferably, in an embodiment, in the nonaqueous electrolyte of the invention, the total content of the first lithium salt and the second lithium salt is about 15.4-17.5 wt %. For example, about 10 wt %, about 11 wt %, about 12 wt %, about 12.5 wt %, about 13 wt %, about 13.5 wt %, about 14 wt %, about 15 wt %, about 15.4 wt %, about 15.5 wt %, about 16 wt %, about 16.3 wt %, about 16.5 wt %, about 17 wt %, about 17.5 wt %, about 17.6 wt %, about 18 wt %, about 19 wt %, about 20 wt %. An excessively high total content of the first lithium salt and the second lithium salt may increase the viscosity of the electrolyte and reduce the charge transfer efficiency in the electrolyte and the conductivity. A too low total content of the first lithium salt and the second lithium salt cannot achieve the effect of improving the conductivity of the electrolyte.

Other Additives

In the nonaqueous electrolyte of the invention, other additives may be optionally selected from the group consisting of linear carbonates, cyclic carbonates, cyclic sulfonates, or a combination thereof.

The selection of the linear carbonates and cyclic carbonates is as illustrated in the foregoing paragraphs, and the linear carbonates and the cyclic carbonates are selected from carbonates other than the solvents.

Examples of cyclic sulfonates include, but are not limited to, 1,3-propanesultone (PS), ethylene sulfate (DTD), and the like.

In one embodiment, the nonaqueous electrolyte of the invention further includes one or more other additives selected from the group consisting of vinylene carbonate, fluoroethylene carbonate, dimethyl carbonate, 1,3-propanesultone, ethylene sulfate, propylene carbonate.

In one embodiment, in the nonaqueous electrolyte of the invention, the content of the other additives is about 0-10 wt %. Preferably, in an embodiment, in the nonaqueous electrolyte of the invention, the content of the other additives is about 2-7 wt %. More preferably, in an embodiment, in the nonaqueous electrolyte of the invention, the content of the other additives is about 4-6 wt %. For example, about 0 wt %, about 1 wt %, about 2 wt %, about 2.5 wt %, about 3 wt %, about 3.5 wt %, about 4 wt %, about 4.5 wt %, about 5 wt %, about 5.5 wt %, about 6 wt %, about 7 wt %, about 8 wt %, about 9 wt %, about 10 wt %. A suitable content of the other additives contributes to improving the performance of the battery, such as the high temperature stability, the low temperature stability, and the film formation stability of the battery. For example, adding ethylene sulfate to the nonaqueous electrolyte of the invention can effectively improve the low-temperature performance of the battery containing the nonaqueous electrolyte and contributes to high-temperature cycle performance and high-temperature storage performance.

Power Storage Device

For yet another aspect, the invention provides a power storage device including the compound represented by formula (I) of the invention, or the nonaqueous electrolyte of the invention.

Preferably, in an embodiment, the power storage device is a secondary battery comprising a positive electrode, a negative electrode, and a nonaqueous electrolyte in which an electrolyte salt is dissolved in a nonaqueous solvent. In the invention, elements such as positive electrodes and negative electrodes other than the nonaqueous electrolyte of the invention can be used without particular limitations.

Positive Electrode Material

The active material of the positive electrode may be a composite metal oxide composed of lithium and one or more selected from cobalt, manganese, and nickel. In one embodiment, the active material of the positive electrode is a single component. In another embodiment, the active material of the positive electrode is a mixture of the composite metal oxides.

Preferably, in an embodiment, the lithium composite metal oxide used in the invention is selected from $LiCoO_2$, $LiMn_2O_4$, $LiNiO_2$, $LiCo_{1-x}Ni_xO_2$ (0.01<x<1), $LiNi_{1/3}Co_{1/3}Mn_{1/3}O_2$, $LiNi_{0.65}Co_{0.15}Mn_{0.2}O_2$, $LiNi_{0.55}Co_{0.15}Mn_{0.3}O_2$, $LiNi_{0.8}Co_{0.1}Mn_{0.1}O_2$, $LiNi_{0.55}Co_{0.1}Mn_{0.35}O_2$, $LiNi_{1/2}Mn_{3/2}O_4$, $LiCo_{0.98}Mg_{0.02}O_2$, and a combination thereof. More preferably, in an embodiment, the lithium composite metal oxide used in the invention is selected from $LiNi_{0.65}Co_{0.15}Mn_{0.2}O_2$, $LiNi_{0.55}Co_{0.15}Mn_{0.3}O_2$, $LiNi_{0.8}Co_{0.1}Mn_{0.1}O_2$ or $LiNi_{0.55}Co_{0.1}Mn_{0.35}O_2$, and a combination thereof.

In addition, to improve safety and cycle characteristics during overcharge, or to enable use at a charging potential of 4.3 V or more, a part of the lithium mixed metal oxide may be substituted with other elements. For example, part of cobalt, manganese, and nickel may be substituted with at least one element such as Sn, Mg, Fe, Ti, Al, Zr, Cr, V, Ga, Zn, Cu, Bi, Mo, La, and the like, or part of O is substituted with S or F, or compounds containing these other elements are covered.

Preferably, lithium composite metal oxides, such as $LiCoO_2$, $LiMn_2O_4$, and $LiNiO_2$, can be used when the charging potential of the positive electrode is 4.3 V or more in terms of Li in a fully charged state. More preferably, lithium composite metal oxides, such as $LiCo_{1-x}M_xO_2$ (where M is at least one element selected from Sn, Mg, Fe, Ti, Al, Zr, Cr, V, Ga, Zn, and Cu, $0.001 \leq x \leq 0.05$), $LiNi_{1/3}Mn_{1/3}Co_{1/3}O_2$, $LiNi_{0.65}Co_{0.15}Mn_{0.2}O_2$, $LiNi_{0.55}Co_{0.15}Mn_{0.3}O_2$, $LiNi_{0.8}Co_{0.1}Mn_{0.1}O_2$ or $LiNi_{0.55}Co_{0.1}Mn_{0.35}O_2$, $LiNi_{1/2}Mn_{3/2}O_4$, $Li_2MnO_3$ and $LiMO_2$ (M is transition metal such as Co, Ni, Mn, Fe), can be used in a solid solution when the charging potential is 4.4V or more. If a lithium composite metal oxide that operates at a high charging voltage is used, the electrochemical properties of the electrode at particularly high temperatures are likely to be reduced due to its reaction with the electrolyte during charging, but in the secondary battery of the invention, the reduction in electrochemical properties can be suppressed. Specifically, in the case of a positive electrode containing Mn, the resistance of the battery tends to increase easily due to the elution of Mn ions from the positive electrode, so when used in a wide temperature range, the electrochemical properties of the electrodes tend to be easily reduced. In the secondary battery of the invention, the use of the foregoing materials as the positive electrode material of the battery can suppress the reduction of these electrochemical properties.

The positive electrode can be prepared by the following exemplary methods. The active material of the positive electrode is mixed with conductive agents and binders. The conductive agents are, for example, acetylene black and carbon black. The binders are, for example, polytetrafluoroethylene (PTFE), polyvinylidene fluoride (PVDF), copolymer of styrene and butadiene (SBR), copolymer of acrylonitrile and butadiene (NBR), carboxymethyl cellulose (CMC), ethylene-propylene-diene terpolymer, and the like. After a positive electrode mixture is formed by adding a high boiling point solvent such as 1-methyl-2-pyrrolidone and kneading, the positive electrode mixture is applied to an aluminum foil or a stainless steel strip of the current collector, dried, and pressurized into the form, and then the heat treatment is carried out under vacuum at a temperature of about 50-250° C. for about 2 hours.

Negative Electrode Material

The active material of the negative electrode can be a carbon material that can be embedded in or de-embedded from lithium in lithium metal or lithium alloy. The active material of the negative electrode includes, but not limited to, easily-graphitizable carbon, hardly-graphitizable carbon with a crystal plane distance of (002) plane of 0.37 nm or more, graphite whose crystal plane distance of the (002) plane is 0.34 nm or less, and the like. In addition, the active material of the negative electrode may be a lithium titanate compound such as tin (element), a tin compound, silicon (element), a silicon compound, $Li_4Ti_5O_{12}$, or a combination thereof.

Preferably, in an embodiment, the active material of the negative electrode used in the power storage device of the invention is selected from silicon element, silicon compound, artificial graphite, graphite or silicon-oxygen composite artificial graphite. More preferably, in an embodiment, the active material of the negative electrode used in the power storage device of the invention is selected from artificial graphite, graphite, or silicon-oxygen composite artificial graphite.

The negative electrode can be prepared by the following methods. With the same conductive agents, binders, and high-boiling point solvents as those used for the preparation of the positive electrode, a negative electrode mixture is prepared by kneading, and next the negative electrode mixture is applied to a copper foil or the like of the current collector, dried, and pressurized into the form, and then the heat treatment is carried out under vacuum at a temperature of about 50-250° C. for about 2 hours.

Manufacture of the Secondary Battery

The secondary battery of the invention can be prepared by the following exemplary methods.

The positive and negative electrode pieces and the diaphragm made of polyethylene are stacked in the order of negative electrode, diaphragm, positive electrode, and diaphragm, and the last one is the negative electrode to obtain a bare cell. The bare cell is hot-pressed so that the polyvinylidene fluoride (PVDF) on the surface of the diaphragm bonds the electrode pieces together. After being welded with tabs, the hot-pressed bare cell is disposed in an aluminum-plastic film with a punched hole, and a hot-melt packaging is performed to obtain a pre-packaged battery with a liquid injection port. After the pre-packaged battery is disposed in a vacuum furnace to be fully baked and dried, a certain amount of electrolyte is injected from the liquid injection port, and the liquid injection port is packaged in a vacuum environment to obtain the secondary battery.

Performance of the Secondary Battery

The secondary battery of the invention can be tested by the following method.

(1) Initial Discharge Capacity Test of the Secondary Battery

The prepared battery is disposed on a fixture, and the battery is charged to 4.3 V with a first constant current at 25° C. and then discharged to 2.8 V with a second constant current. Optionally, the operation is repeated for a second cycle to allow the battery to stabilize. Optionally, a third charge-discharge cycle is performed, and after being charged to 4.3 V with a third constant current, the batter is charged with a constant voltage of 4.3 V until the current value reaches 0.05 C and discharged to 2.8 V with a fifth constant current. Optionally, a fourth charge-discharge cycle is performed, and after being charged to 4.3 V with a sixth constant current, the batter is charged with a constant voltage of 4.3 V until the current value reaches 0.05 C and discharged to 2.8 V with a seventh constant current. After the operations, the initial discharge capacity can be finally obtained. The first constant current to the seventh constant current can be 1 C, 5 C, 0.1 C, 0.2 C, and the like. 1 C represents the current value for discharging the battery at the reference capacity in 1 hour, 5 C represents 5 times the foregoing current value, and 0.1 C and 0.2 C each represent 1/10 and 1/5 of the foregoing current value.

(2) Cycle Test of the Secondary Battery

The secondary battery is cycle charged and discharged with a current of 1 C within the specified potential range. The capacity of each lap is recorded, and the test ends when the battery capacity drops to 80% of the capacity of the first lap.

(3) DC Resistance (DCR) Test of the Secondary Battery

At the specified temperature, when the battery is discharged to 50% SOC (state of charge, reflecting the remaining capacity of the battery) with a current of 1 C, the current is increased to 4 C and maintained for 30 s, the difference between the updated stable voltage and the original platform voltage is detected, and the ratio of the difference to the 3 C current value is the DC resistance of the battery. The DCR growth rate is obtained by comparing the DCR at the end of the cycle with the DCR at the beginning of the cycle.

(4) Volume Change Test of Gas Produced by the Secondary Battery

After fixed by a string, the secondary battery is completely immersed in 25° C. water, and the weight difference before and after the immersion is recorded, and the volume difference is converted from the density of the water at 25° C.

(5) Capacity Recovery Rate Test of the Secondary Battery at 60° C.

The charged secondary battery is disposed in an environment at 60° C. for 60 days, and after 60 days, the reversible capacity is measured to obtain the capacity recovery rate relative to that before 60 days.

In an embodiment, the secondary battery of the invention has an initial DC resistance (DCR) of about 1.10-1.35 mohm. Preferably, in an embodiment, the initial DC resistance (DCR) of the secondary battery of the invention is preferably about 1.12-1.35 mohm. For example, about 1.10 mohm, about 1.12 mohm, about 1.13 mohm, about 1.14 mohm, about 1.15 mohm, about 1.17 mohm, about 1.2 mohm, about 1.21 mohm, about 1.22 mohm, about 1.23 mohm, about 1.24 mohm, about 1.25 mohm, about 1.26 mohm, about 1.27 mohm, about 1.28 mohm, about 1.29 mohm, about 1.30 mohm, about 1.31 mohm, about 1.32 mohm, about 1.33 mohm, about 1.34 mohm, about 1.35 mohm, about 1.36 mohm, about 1.37 mohm, about 1.38 mohm, about 1.39 mohm, about 1.40 mohm.

In one embodiment, after the four charge-discharge cycles, the DC resistance growth rate of the secondary battery of the invention is about 15% to about 35%. Preferably, in an embodiment, after the four charge-discharge cycles, the DC resistance growth rate of the secondary battery of the invention is about 20% to about 29%. For example, about 20%, about 21%, about 22%, about 23%, about 24%, about 25%, about 26%, about 27%, about 28%, about 29%, about 30%, about 31%, about 32%.

In one embodiment, after the four charge-discharge cycles, the growth rate of gas volume produced by the secondary battery of the invention is about 3% to about 20%. Preferably, in an embodiment, after the four charge-discharge cycles, the growth rate of the gas volume produced by the secondary battery of the invention is about 3% to about 11%. For example, about 3%, about 4%, about 5%, about 6%, about 7%, about 8%, about 9%, about 10%, about 11%, about 12%, about 13%, about 14%.

In one embodiment, the secondary battery of the invention has a DC resistance growth rate of about 10% to about 30% after being disposed in an environment at 60° C. for 60 days. Preferably, in an embodiment, the secondary battery of the invention has a DC resistance growth rate of about 15% to about 22% after being disposed in an environment at 60° C. for 60 days. For example, about 5%, about 10%, about 15%, about 20%, about 21%, about 22%, about 23%, about 25%, about 30%.

In one embodiment, the secondary battery of the invention has a capacity recovery rate of about 90% to about 98% after being disposed in an environment at 60° C. for 60 days. Preferably, in an embodiment, the secondary battery of the invention has a capacity recovery rate of about 92% to about 98% after being disposed in an environment at 60° C. for 60 days. For example, about 90%, about 91%, about 92%, about 93%, about 94%, about 95%, about 96%, about 97%, about 98%.

In one embodiment, after the secondary battery of the invention is disposed in an environment at 60° C. for 60 days, the growth rate of the gas volume produced by the secondary battery is about 1% to about 50%. Preferably, in an embodiment, after the secondary battery of the invention is disposed in an environment at 60° C. for 60 days, the growth rate of the gas volume produced by the secondary battery is about 1% to about 10%. For example, about 1%, about 2%, about 3%, about 4%, about 5%, about 6%, about 7%, about 8%, about 9%, about 10%.

In one embodiment, the secondary battery of the invention is disposed in an environment at −30° C., and the secondary battery of the invention has a DC resistance growth rate of about 10% after the four charge-discharge cycles.

In one embodiment, the secondary battery of the invention has a number of turns of about 1900-2800 when it drops to 80% SOH. Preferably, in an embodiment, the secondary battery of the invention has a number of turns of about 1995-2501 when it drops to 80% SOH. For example, about 1995, about 2004, about 2125, about 2131, about 2198, about 2209, about 2212, about 2293, about 2501.

Electric Device

For one aspect, the invention provides an electric device, characterized by that the electric device includes the power storage device of the invention.

Preferably, in an embodiment, the electric device is selected from a mobile vehicle, an electric two-wheeled vehicle, and a power storage system.

More preferably, in an embodiment, the electric device is a mobile vehicle, which is preferably selected from an electric vehicle (EV), a hybrid electric vehicle (HEV), and a plug-in hybrid electric vehicle (PHEV).

In a yet aspect, the invention also relates to the use of the compound represented by formula (I) as an additive for a nonaqueous electrolyte.

Beneficial Effects

With the compound represented by formula (I) as the nonaqueous electrolyte additive, the negative electrode film formation of the secondary battery of the invention can be improved, and the cycle stability of the secondary battery of the invention can be improved. After the secondary battery is charged and discharged for many times, the DC resistance of the secondary battery and the growth rate of the produced gas volume are relatively low. In addition, after adding the compound represented by formula (I) to the nonaqueous electrolyte of the secondary battery, the high temperature performance of the secondary battery, such as high temperature stability, and the like, can also be improved. After the secondary battery of the invention is disposed in an environment at 60° C. for 60 days, the DC resistance growth rate and the growth rate of the produced gas volume of the secondary battery have a slight change, and the capacity recovery rate is as high as 92% or more. In addition, after adding the compound represented by formula (I) to the nonaqueous electrolyte of the secondary battery, the low temperature performance of the secondary battery can also be improved.

EMBODIMENTS

It should be noted that the following embodiments are only examples for clearly illustrating the technical solutions of the invention rather than limiting the invention. For those of ordinary skill in the art, other different forms of changes or modifications can also be made on the basis of the foregoing description, and it is not necessary and impossible to list all the implementation manners here, and such derived obvious changes or modifications are still within the protection scope of the invention.

Instruments and reagent materials used herein were commercially available unless otherwise indicated.

Instruments

Temperature box: purchased from Giant Force Instrument Enterprise Co., Ltd. (EEPCT-408-40-SSP-AR) Charger and discharger: purchased from Sinexcel Co., Ltd. (BTS0510C80-HP)

Materials

The reagents used herein, such as ethylene carbonate, ethyl methyl carbonate, diethyl carbonate and $LiPF_6$, were purchased from Shanghai Sinopharm or Sigma-Aldrich.

For Comparative examples 3-5, the prior art compounds $LiSC_4O_8$, $LiSF_2C_2O_4$ or their combinations were used as additives for the secondary battery, and the structure of $LiSC_4O_8$ is

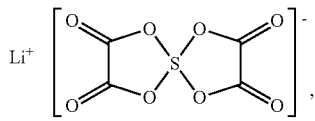

and the structure of $LiSF_2C_2O_4$ is

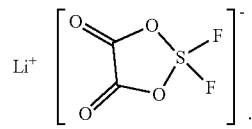

The structures of the compounds were determined by nuclear magnetic resonance ($^{19}F$ NMR) and liquid chromatography-mass spectrometry (HPLC-MS).

$^{19}F$ NMR was measured with a Bruker 500 MHz AVANCE III nuclear magnetic spectrometer, the solvent was deuterochloroform ($CDCl_3$), the internal standard was deuterated fluoroform ($CDF_3$), and chemical shift ($\delta$) was given in units of $10^{-6}$ (ppm).

Liquid chromatography uses ion chromatography. Column: Metrosep ASUPP7-250 (4.0 mm inside diameter×250 mm). The detector used a Metrohm Model 819 detector. The ion chromatography detection conditions are as follows.

Column temperature: 45° C.; flow rate: 0.7 mL/min; eluent: 10 mM sodium carbonate ($Na_2CO_3$) solution, 35% acetonitrile by volume; injection volume: 100 μL; detection range and full measuring range and graduation of the detector: 100 μS/s.

Mass spectrometry was performed using an Agilent 6410 triple quadrupole mass spectrometer. The mass spectrometry detection conditions are as follows.

The mass spectrometer type is electrospray ionization (ESI); nebulizer pressure: 45 psig; drying gas flow rate: 12 L/min; drying gas temperature: 350° C.; capillary voltage: 1750 V; fragmentation voltage: 120 V; collision energy: 30 V.

Synthesis Embodiment

Synthesis of a compound

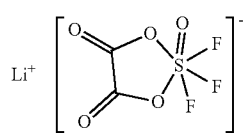

(also referred to as $LiSF_3C_2O_5$ herein)

$SO_2F_2$ was mixed with anhydrous oxalic acid, $P_2O_5$ was added to the mixture for being dehydrated into anhydride, the obtained mixture is separated by column chromatography to obtain fluorosulfuric acid oxalic anhydride, which was mixed and stirred with LiF to form a salt, and the compound was obtained.

MS m/z (ESI): 173 [M]$^-$;
$^{19}F$ NMR (471 MHz, $CDCl_3$) δ: 65.

Synthesis of a compound

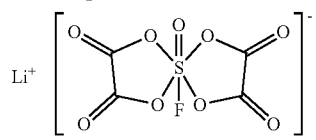

(also referred to herein as $LiSFC_4O_9$)

$SO_3$ is mixed with anhydrous oxalic acid, $P_2O_5$ is added to the mixture for being dehydrated into anhydride, the obtained mixture is separated by column chromatography to obtain oxalic anhydride fluorosulfuric acid, which was mixed and stirred with LiF to form a salt, and the compound was obtained.

MS m/z (ESI): 207 [M]$^-$;
$^{19}F$ NMR (471 MHz, $CDCl_3$) δ: 72.

A compound

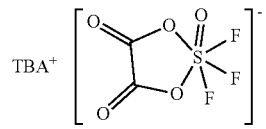

(herein also referred to $TBASF_3C_2O_5$) was synthesized by a method similar to that of the compound

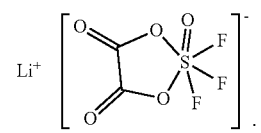

MS m/z (ESI): 173 [M]$^-$;
$^{19}F$ NMR (471 MHz, $CDCl_3$) δ: 65

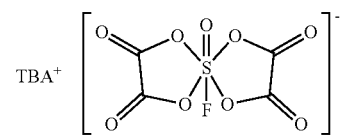

A compound (herein also referred to $TBASFC_4O_9$) was synthesized by a method similar to that of the compound

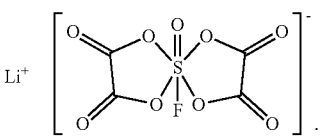

MS m/z (ESI): 207 [M]$^-$;
$^{19}F$ NMR (471 MHz, $CDCl_3$) δ: 72

Preparation Example

Preparation of a Positive Electrode of the Secondary Battery

The positive electrode of the secondary battery of the invention can be prepared by the following method.

The active material of the positive electrode, acetylene black, and polyvinylidene fluoride (PVDF) were added to anhydrous N-methylpyrrolidone solvent and mixed to form a slurry. The mass ratio of the active material of the positive electrode, to acetylene black, and to polyvinylidene fluoride (PVDF) is 90:5:5. The obtained slurry was coated on one side of an aluminum foil pre-coated with a conductive assistant, and the thickness of the aluminum foil was 15 μm. After drying the aluminum foil, the thickness of the aluminum foil was extended to 80 μm by a roll press. The obtained electrode piece was then cut into a shape as follows: the active material layer was 30 mm wide and 40 mm long, and the uncoated portion was 5 mm wide and 9 mm long. The obtained product is the positive electrode piece of the secondary battery.

Preparation of a Negative Electrode of the Secondary Battery

The negative electrode of the secondary battery of the invention can be prepared by the following method.

The active material of the negative electrode, the aqueous dispersion of sodium carboxymethyl cellulose with a mass fraction of 1%, and an aqueous dispersion of styrene-butadiene rubber with a mass fraction of 50% were mixed to prepare a slurry. The mass ratio of the active material of the negative electrode, to the aqueous dispersion of sodium carboxymethyl cellulose, and to the aqueous dispersion of styrene-butadiene rubber is 98:100:2. The obtained slurry was coated on one side of a copper foil having a thickness of 10 μm. After being dried, the copper foil was rolled by a roller press, and the obtained electrode piece was cut into a shape as follows: the active material layer was 30 mm wide and 40 mm long, and the uncoated part was 5 mm wide and 9 mm long. The obtained product is the negative electrode piece of the secondary battery.

Preparation of an Electrolyte of the Secondary Battery

The electrolyte of the secondary battery of the invention can be prepared by the following method.

In an atmosphere of dry argon gas, different nonaqueous solvents were taken and mixed, then fully dried lithium salts and additives were added to the mixed solvent, and other additives were added to obtain the nonaqueous electrolyte.

Preparation of the Secondary Battery

The secondary battery of the invention can be prepared by the following method.

The positive and negative electrode pieces and the diaphragm made of polyethylene are stacked in the order of negative electrode, diaphragm, positive electrode, and diaphragm, and the last one is the negative electrode to obtain a bare cell. The bare cell is hot-pressed so that the polyvinylidene fluoride (PVDF) on the surface of the diaphragm bonds the electrode pieces together. After being welded with tabs, the hot-pressed bare cell is disposed in an aluminum-plastic film with a punched hole, and a hot-melt packaging is performed to obtain a pre-packaged battery with a liquid injection port. After the pre-packaged battery is disposed in a vacuum furnace to be fully baked and dried, a certain amount of electrolyte is injected from the liquid injection port, and the liquid injection port is packaged in a vacuum environment to obtain the secondary battery.

Secondary batteries of Embodiments 1-9 and Secondary batteries of Comparative examples 1-3 were prepared according to the foregoing illustrated method.

Example 1

In a dry argon atmosphere, ethylene carbonate (EC), ethyl methyl carbonate (EMC), and diethyl carbonate (DEC) were mixed in a mass ratio of 3:5:2. A sufficiently dried first lithium salt $LiPF_6$ was added so that its content in the nonaqueous electrolyte was 14.5 wt %. Based on the total weight of the nonaqueous electrolyte, the following components were each added: 1.5% $LiPF_2O_2$ (lithium difluorophosphate) and 1% LiFSI (lithium bisfluorosulfonimide) as the second lithium salt, 4% vinylene carbonate (VC), 0.5% 1,3-propane sultone (PS), and 1% $LiSF_3C_2O_5$ to obtain a nonaqueous electrolyte. The secondary battery is prepared according to the foregoing method, the active material of the positive electrode is $LiNi_{0.65}Co_{0.15}Mn_{0.2}O_2$, and the active material of the negative electrode is artificial graphite.

Example 2

In a dry argon atmosphere, ethylene carbonate (EC), ethyl methyl carbonate (EMC), and diethyl carbonate (DEC) were mixed in a mass ratio of 3:5:2. A sufficiently dried first lithium salt $LiPF_6$ was added so that its content in the nonaqueous electrolyte was 14.5 wt %. Based on the total weight of the nonaqueous electrolyte, the following components were each added: 1.5% $LiPF_2O_2$ (lithium difluorophosphate) and 1% LiFSI (lithium bisfluorosulfonimide) as the second lithium salt, 4% vinylene carbonate (VC), 0.5% 1,3-propane sultone (PS), 0.2% $LiSF_3C_2O_5$, and 0.8% $TBASF_3C_2O_5$ to obtain a nonaqueous electrolyte. The secondary battery is prepared according to the foregoing method, the active material of the positive electrode is $LiNi_{0.65}Co_{0.15}Mn_{0.2}O_2$, and the active material of the negative electrode is artificial graphite.

Example 3

In a dry argon atmosphere, ethylene carbonate (EC), ethyl methyl carbonate (EMC), and diethyl carbonate (DEC) were mixed in a mass ratio of 3:5:2. A sufficiently dried first lithium salt $LiPF_6$ was added so that its content in the nonaqueous electrolyte was 13.0 wt %. Based on the total weight of the nonaqueous electrolyte, the following components were each added: 1.5% $LiPF_2O_2$ (lithium difluorophosphate) and 1% LiFSI (lithium bisfluorosulfonimide) as the second lithium salt, 4% vinylene carbonate (VC), 0.5% 1,3-propane sultone (PS), and 1% $LiSFC_4O_9$ to obtain a nonaqueous electrolyte. The secondary battery is prepared according to the foregoing method, the active material of the positive electrode is $LiNi_{0.65}Co_{0.15}Mn_{0.2}O_2$, and the active material of the negative electrode is artificial graphite.

Example 4

In a dry argon atmosphere, ethylene carbonate (EC), ethyl methyl carbonate (EMC), and diethyl carbonate (DEC) were mixed in a mass ratio of 3:5:2. A sufficiently dried first lithium salt $LiPF_6$ was added so that its content in the nonaqueous electrolyte was 13.0 wt %. Based on the total weight of the nonaqueous electrolyte, the following components were each added: 1.5% $LiPF_2O_2$ (lithium difluorophosphate) and 1% LiFSI (lithium bisfluorosulfonimide) as the second lithium salt, 4% vinylene carbonate (VC), 0.5% 1,3-propane sultone (PS), 0.2% $LiSFC_4O_9$, and 0.8% $TBASFC_4O_9$ to obtain a nonaqueous electrolyte. The secondary battery is prepared according to the foregoing method, the active material of the positive electrode is $LiNi_{0.65}Co_{0.15}Mn_{0.2}O_2$, and the active material of the negative electrode is artificial graphite.

Example 5

In a dry argon atmosphere, ethylene carbonate (EC), ethyl methyl carbonate (EMC), and diethyl carbonate (DEC) were mixed in a mass ratio of 3:5:2. A sufficiently dried first lithium salt $LiPF_6$ was added so that its content in the nonaqueous electrolyte was 13.0 wt %. Based on the total weight of the nonaqueous electrolyte, the following components were each added: 1% $LiPF_2O_2$ (lithium difluorophosphate), 1% LiFSI (lithium bisfluorosulfonimide), and 1% LiTFSI (bis(trifluorophosphonate) Methylsulfonyl) lithium amide) as the second lithium salt, 4% ethylene sulfate (DTD), 0.5% vinylene carbonate (VC), 1% 1,3-propane sultone (PS), 0.8% $LiSF_3C_2O_5$, and 0.2% $LiSFC_4O_9$ to obtain a nonaqueous electrolyte. The secondary battery is prepared according to the foregoing method, the active material of the positive electrode is $LiNi_{0.55}Co_{0.15}Mn_{0.3}O_2$, and the active material of the negative electrode is artificial graphite.

Example 6

In a dry argon atmosphere, ethylene carbonate (EC), ethyl methyl carbonate (EMC), and diethyl carbonate (DEC) were mixed in a mass ratio of 3:6:1. A sufficiently dried first lithium salt $LiPF_6$ was added so that its content in the nonaqueous electrolyte was 13.5 wt %. Based on the total weight of the nonaqueous electrolyte, the following components were each added: 1% $LiPF_2O_2$ (lithium difluorophosphate), 0.5% LiODFP (lithium bis-oxalate difluorophosphate) and 0.4% $LiBF_4$ as the second lithium salt, 0.5% ethylene sulfate (DTD), 4% propylene carbonate (PC), 0.5% vinylene carbonate (VC), 1% 1,3-propane sultone (PS), 0.5% $LiSF_3C_2O_5$, and 0.5% $LiSFC_4O_9$. The active material of the positive electrode is $LiNi_{0.55}Co_{0.15}Mn_{0.3}O_2$, and the active material of the negative electrode is graphite.

Example 7

In a dry argon atmosphere, ethylene carbonate (EC), ethyl methyl carbonate (EMC), and diethyl carbonate (DEC) were mixed in a mass ratio of 3:5:2. A sufficiently dried first lithium salt $LiPF_6$ was added so that its content in the nonaqueous electrolyte was 14 wt %. Based on the total weight of the nonaqueous electrolyte, the following components were each added: 1% $LiPF_2O_2$ (lithium difluorophosphate) and 0.5% LiODFB (lithium difluorooxalate borate) as the second lithium salt, 3% fluoroethylene carbonate (FEC), 1% 1,3-propane sultone (PS), 3% $LiSF_3C_2O_5$, and 3% $LiSFC_4O_9$. The active material of the positive electrode is $LiNi_{0.8}Co_{0.1}Mn_{0.1}O_2$, and the active material of the negative electrode is silicon-oxygen composite artificial graphite.

Example 8

In a dry argon atmosphere, ethylene carbonate (EC), ethyl methyl carbonate (EMC), and diethyl carbonate (DEC) were mixed in a mass ratio of 3:4:3. A sufficiently dried first lithium salt $LiPF_6$ was added so that its content in the nonaqueous electrolyte was 14 wt %. Based on the total weight of the nonaqueous electrolyte, the following components were each added: 1% $LiPF_2O_2$ (lithium difluorophosphate), 1.5% LiFSI (lithium bisfluorosulfonimide salt), 0.1% $LiBF_4$ and 1% LiTFSI (bis(trifluoromethylsulfonyl)) lithium amide) as the second lithium salt, 4% dimethyl carbonate (DMC), 0.5% vinylene carbonate (VC), 1.5% 1,3-propane sultone (PS), 0.5% $LiSF_3C_2O_5$, and 0.5% $LiSFC_4O_9$. The active material of the positive electrode is $LiNi_{0.65}Co_{0.15}Mn_{0.3}O_2$, and the active material of the negative electrode is graphite.

Example 9

In a dry argon atmosphere, ethylene carbonate (EC), ethyl methyl carbonate (EMC), and diethyl carbonate (DEC) were mixed in a mass ratio of 3:5:2. A sufficiently dried first lithium salt $LiPF_6$ was added so that its content in the nonaqueous electrolyte was 10 wt %. Based on the total weight of the nonaqueous electrolyte, the following components were each added: 1% LiFSI (lithium bisfluorosulfonimide salt) and 1% LiTFSI (bis(trifluoromethylsulfonyl)) lithium amide) as the second lithium salt, 2% vinylene carbonate (VC), 1% 1,3-propane sultone (PS), 2% $LiSF_3C_2O_5$, and 2% $LiSFC_4O_9$. The active material of the positive electrode is $LiNi_{0.55}Co_{0.1}Mn_{0.35}O_2$, and the active material of the negative electrode is artificial graphite.

Comparative Example 1

In a dry argon atmosphere, ethylene carbonate (EC), ethyl methyl carbonate (EMC), and diethyl carbonate (DEC) were mixed in a mass ratio of 3:5:2. A sufficiently dried first lithium salt $LiPF_6$ was added so that its content in the nonaqueous electrolyte was 13 wt %. Based on the total weight of the nonaqueous electrolyte, the following components were each added: 1.5% $LiPO_2F_2$ (lithium difluorophosphate) and 1% LiTFSI (bis(trifluoromethylsulfonyl)) lithium amide) as the second lithium salt, 4% vinylene carbonate (VC), and 0.5% 1,3-propane sultone (PS). The active material of the positive electrode is $LiNi_{0.65}Co_{0.15}Mn_{0.2}O_2$, and the active material of the negative electrode is artificial graphite.

Comparative Example 2

In a dry argon atmosphere, ethylene carbonate (EC), ethyl methyl carbonate (EMC), and diethyl carbonate (DEC) were mixed in a mass ratio of 3:5:2. A sufficiently dried first lithium salt $LiPF_6$ was added so that its content in the nonaqueous electrolyte was 14 wt %. Based on the total weight of the nonaqueous electrolyte, the following components were each added: 1% $LiPF_2O_2$ (lithium difluorophosphate) and 0.5% LiODFB (lithium difluorooxalate borate) as the second lithium salt, 3% fluoroethylene carbonate (FEC), and 1% 1,3-propane sultone (PS). The active material of the positive electrode is $LiNi_{0.8}Co_{0.1}Mn_{0.1}O_2$, and the active material of the negative electrode is silicon-oxygen composite artificial graphite.

Comparative Example 3

In a dry argon atmosphere, ethylene carbonate (EC), ethyl methyl carbonate (EMC), and diethyl carbonate (DEC) were mixed in a mass ratio of 3:6:1. A sufficiently dried first lithium salt $LiPF_6$ was added so that its content in the nonaqueous electrolyte was 13.5 wt %. Based on the total weight of the nonaqueous electrolyte, the following components were each added: 1% $LiPF_2O_2$ (lithium difluorophosphate), 0.5% LiODFP (lithium bis-oxalate difluorophosphate) and 0.4% $LiBF_4$ as the second lithium salt, 0.5% ethylene sulfate (DTD), 4% propylene carbonate (PC), 0.5% vinylene carbonate (VC), and 1% 1,3-propane sultone (PS). The active material of the positive electrode is $LiNi_{0.55}Co_{0.15}Mn_{0.3}O_2$, and the active material of the negative electrode is graphite.

Comparative Example 4

For the preparation of the secondary battery of Comparative example 4, refer to Example 1, in which 1% $LiSC_4O_8$ is used as an additive to replace $LiSF_3C_2O_5$ in Example 1.

Comparative Example 5

For the preparation of the secondary battery of Comparative example 5, refer to Example 1, in which 1% $LiSF_2C_2O_4$ is used as an additive to replace $LiSF_3C_2O_5$ in Example 1.

Comparative Example 6

For the preparation of the secondary battery of Comparative example 6, refer to Example 9, the content of $LiPF_6$ is 12 wt %, and 1% $LiSC_4O_8$ and 1% of $LiSF_2C_2O_4$ are used as additives to replace $LiSF_3C_2O_5$ and $LiSFC_4O_9$ of Example 9.

Test

The secondary battery of the invention can be tested by the following method.

(1) Initial Discharge Capacity and Cycle Test of the Secondary Battery

The prepared battery was subjected to chemical aging treatment and then disposed on the fixture. At 25° C., the activated battery was charged to 4.3 V with a current of 1 C, and the current was maintained at a constant voltage of 0.05 C and then discharged to 2.8 V at 1 C. The discharge capacity was recorded. The initial DCR of the battery was recorded in the first turn of discharge, and then the cycle test was performed until the battery discharge capacity was 80% of the capacity of the first turn. After the cycle, the DCR and DCR growth rate of the battery were recorded, and the number of turns when the battery drops to 80% SOH (battery state of health) and the produced gas volume change were recorded.

The DC resistance of the secondary battery and the change in the volume of the produced gas are measured by the following methods:

(i) DC Resistance (DCR) Test of the Secondary Battery

At the specified temperature, when the battery is discharged to 50% SOC (state of charge, reflecting the remaining capacity of the battery) with a current of 1 C, the current is increased to 4 C and maintained for 30 s, the difference between the updated stable voltage and the original platform voltage is detected, and the ratio of the difference to the 3 C current value is the DC resistance of the battery. The DCR growth rate is obtained by comparing the DCR at the end of the cycle with the DCR at the beginning of the cycle.

(ii) Volume Change Test of Gas Produced by the Secondary Battery

After fixed by a string, the secondary battery is completely immersed in 25° C. water, and the weight difference before and after the immersion is recorded, and the volume difference is converted from the density of the water at 25° C.

(2) Capacity Recovery Rate Test of the Secondary Battery at 60° C.

After aging treatment of Examples 5, 6, 7, and Comparative examples 2 and 3, the activated batteries were charged to 4.3 V with a current of 1 C at 25° C., and the current was maintained at a constant voltage of 0.05 C. The secondary battery was then disposed in an environment at 60° C. for 60 days, and its 60-day capacity recovery rate was recorded.

(3) Cycle Test of the Secondary Battery at 60° C.

After aging treatment of Examples 5, 6, 7, and Comparative examples 2 and 3, the activated batteries were charged to 4.25 V with a current of 1 C at 60° C., and the voltage was kept constant to a current of 0.05 C and then was discharged to 3.0 V at 1 C. The discharge capacity was recorded. The initial DCR of the battery was recorded in the first turn of discharge, and then the cycle test was performed until the battery discharge capacity was 80% of the capacity of the first turn, and the DCR, DCR growth rate and produced gas volume change of the battery were recorded after the cycle.

(4) Cycle Test of the Secondary Battery at −30° C.

After aging treatment of Example 6 and Comparative example 3, the activated batteries were charged to 4.25 V with a current of 1 C at −30° C., and the voltage was kept constant to a current of 0.05 C and then was discharged to 3.0 V at 1 C. The discharge capacity was recorded. The initial DCR of the battery was recorded in the first turn of discharge, and then the cycle test was performed until the battery discharge capacity was 80% of the capacity of the first turn, and the DCR growth rate of the battery after the cycle was recorded.

Result

Table 1 shows the test results of the initial discharge capacity, cycle, DC resistance (DCR), and produced gas volume change of the secondary batteries of Examples 1-9. Table 2 shows the test results of the capacity recovery rate test at 60° C. and the test results of the DC resistance (DCR) growth rate at −30° C. of the secondary batteries of Examples 5-7.

TABLE 1

| Example | SOH number of cycles[a] | initial DCR (mohm) | DCR growth rate[b] | growth rate of the produced gas volume |
|---|---|---|---|---|
| 1 | 2212 | 1.22 | 24% | 8% |
| 2 | 2209 | 1.32 | 29% | 10% |
| 3 | 2131 | 1.25 | 24% | 9% |
| 4 | 2125 | 1.35 | 27% | 10% |
| 5 | 2198 | 1.23 | 28% | 5% |
| 6 | 2501 | 1.15 | 25% | 3% |
| 7 | 2004 | 1.2 | 20% | 11% |
| 8 | 2293 | 1.13 | 24% | 6% |
| 9 | 1995 | 1.17 | 27% | 7% |

[a] At 25° C., the number of cycles for the battery to drop to 80% SOH;
[b] DCR growth rate at the end of the cycle As shown in Table 1, the secondary batteries of Examples 1-9 have lower initial DC resistances of only about 1.13-1.35 mohm. After the charge-discharge cycle, the DC resistance growth rates of the secondary batteries of Examples 1-9 are also relatively reduced, only about 20% to about 29%, and the growth rates of the gas volume produced by the secondary batteries are even lower, only about 3%-about 11%. Accordingly, with the compound represented by formula (I) as an additive, the secondary battery of the invention has good stability. After multiple charge-discharge cycles, the DC resistance of the secondary battery has only a small increase, and the produced gas volume changes a little. In addition, when the secondary batteries of Examples 1-9 drop to 80% SOH, they have a relatively high number of cycles, that is 1995-2501. It can be seen that, with the compound represented by formula (I) as an additive, the secondary battery of the invention has a longer service life.

TABLE 2

| Example | DCR growth rate$^a$ | capacity recovery rate$^b$ | growth rate of the produced gas volume$^c$ | DCR growth rate$^d$ |
|---|---|---|---|---|
| 5 | 22% | 97% | 7% | |
| 6 | 15% | 98% | 4% | 10% |
| 7 | 21% | 92% | 6% | |

$^a$DCR growth rate after 60 days at 60° C.;
$^b$capacity recovery rate after 60 days at 60° C.;
$^c$growth rate of the produced gas volume after 60 days at 60° C.;
$^d$DCR growth rate at −30° C. at the end of cycle In Examples 5-7, other additives DTD (ethylene sulfate), PC (propylene carbonate) or FEC (fluoroethylene carbonate) are added to act together with the compound represented by formula (I), which is beneficial to improve the high temperature stability of the battery properties or low temperature stability. As shown in Table 2, the secondary battery of the invention has excellent high-temperature performance, and after repeated charging and discharging at high temperature (e.g., about 60° C.), the DC resistance growth rate of the secondary battery is only 15%-22%, the capacity recovery rate can reach 92%-98%, and the growth rate of the produced gas volume is only 4-7%. The DC resistance growth rate of the secondary battery is only 10% after repeated charging and discharging at low temperature (e.g., about −30° C.). It can be seen that using the compound represented by formula (I) as an additive and acting together with other additives is beneficial to further improve the high temperature and low temperature stability of the secondary battery.

Table 3 shows the test results of the initial discharge capacity, cycle, DC resistance (DCR), and produced gas volume change of the secondary batteries of the Comparative examples. The test conditions are the same as those used in Table 1.

TABLE 3

| Comparative example | SOH the number of cycles$^a$ | initial DCR (mohm) | DCR growth rate$^b$ | growth rate of the produced gas volume |
|---|---|---|---|---|
| 1 | 1297 | 1.43 | 40% | 37% |
| 2 | 573 | 1.59 | 70% | 90% |
| 3 | 1567 | 1.28 | 36% | 6% |
| 4 | 890 | 1.41 | 31% | 16% |
| 5 | 721 | 1.43 | 32% | 21% |
| 6 | 873 | 1.43 | 29% | 18% |

$^a$At 25° C., the number of cycles for the battery to drop to 80% SOH;
$^b$DCR growth rate at the end of the cycle As shown in Table 3, compared to Examples 3 and 7, the compound represented by formula (I) is not added in Comparative examples 1 and 2. When the obtained secondary battery drops to 80% SOH, the number of cycles thereof is only 573-1567, much lower than that of Examples 1-9. It can be seen that the compound represented by formula (I) as an additive can effectively improve the service life of the secondary battery. In addition, compared to Examples 1-9, Comparative example 1-2 has a relatively high DCR, and the battery operating efficiency is reduced. In addition, there are significantly improved DCR growth rate and growth rate of the produced gas volume for Comparative examples 1-2. It can be seen that, as an additive, the compound represented by formula (I) can effectively improve the stability of the secondary battery and reduce the DCR growth rate and the growth rate of the produced gas volume.

As shown in Table 3, compared to Example 1, 1% $LiSC_4O_8$, 1% $LiSF_2C_2O_4$, 1% $LiSC_4O_8$ and 1% $LiSF_2C_2O_4$ are added in Comparative examples 4-6 as additives for the secondary batteries, respectively. First, when the obtained secondary battery drops to 80% SOH, the number of cycles is only 721-890, which is much lower than that of the compounds in the examples. It can be seen that, compared with the additives of the secondary battery in the prior art, the compound represented by formula (I) of the application as an additive can effectively improve the service life of the secondary battery. In addition, compared with the compounds in the examples, those of Comparative examples 4-6 have relatively high DCR, and the cell working efficiency is reduced. In addition, there is a relatively high growth rate of the produced gas volume in Comparative examples 4-6. It can be seen that, compared with the secondary battery additive in the prior art, as an additive, the compound represented by formula (I) of the application can effectively improve the stability of the secondary battery and reduce the growth rate of the produced gas volume.

Table 4 shows the test results of DCR growth rate, capacity recovery rate and growth rate of the produced gas volume for the secondary batteries of Comparative example 2 and 3 at 60° C., and the DC resistance (DCR) growth rate of the secondary battery of Comparative example 3 at −30° C. The test conditions are the same as those used in Table 2.

TABLE 4

| Comparative example | DCR growth rate$^a$ | capacity recovery rate$^b$ | growth rate of the produced gas volume$^c$ | DCR growth rate$^d$ |
|---|---|---|---|---|
| 2 | 67 | 84 | 23 | |
| 3 | 30 | 92 | 15 | 50 |

$^a$DCR growth rate after 60 days at 60° C.;
$^b$capacity recovery rate after 60 days at 60° C.;
$^c$growth rate of the produced gas volume after 60 days at 60° C.;
$^d$DCR growth rate at the end of cycle at −30° C.

As shown in Table 4, compared with Example 7, after being disposed in an environment at 60° C. for 60 days, the secondary battery of Comparative example 2 has a significantly higher DCR growth rate and a relatively lower capacity recovery rate. Therefore, the compound represented by formula (I) as an additive can improve the high temperature performance of the secondary battery. In addition, compared with Example 6, the DC resistance growth rate of the secondary battery of Comparative example 3 is 50% after repeated charging and discharging at low temperature (e.g., about −30° C.), which is much higher than that of Example 6. It can be seen that the compound represented by formula (I) as an additive can improve the low temperature performance of the secondary battery.

The above descriptions are only specific embodiments of the invention and are not intended to limit the scope of the invention. All equivalent modifications made by the invention or directly or indirectly applied in other related technical fields are similarly included within the protection scope of the patent.

What is claimed is:

1. A nonaqueous electrolyte additive, comprising a compound represented by formula (I):

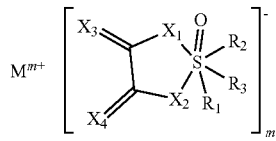

characterized by that,

M is a counter cation;

m is an integer of 1 to 3;

$X_1$, $X_2$, $X_3$ and $X_4$ are each independently selected from oxygen and sulfur;

$R_1$ is selected from halogen, halogenated $C_{1-10}$ alkyl, and halogenated $C_{3-10}$ cycloalkyl;

$R_2$ and $R_3$ are each independently selected from halogen, halogenated $C_{1-10}$ alkyl, and halogenated $C_{3-10}$ cycloalkyl; or $R_2$ and $R_3$ are each independently selected from oxygen or sulfur, and $R_2$ and $R_3$ along with atoms to which $R_2$ and $R_3$ are attached jointly form a moiety of formula (II),

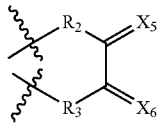

wherein $X_5$ and $X_6$ are each independently selected from oxygen and sulfur.

2. The nonaqueous electrolyte additive according to claim 1, characterized by that, $R_1$ is selected from halogen.

3. The nonaqueous electrolyte additive according to claim 1, characterized by that, $R_2$ and $R_3$ are each independently selected from halogen; or $R_2$ and $R_3$ are each independently oxygen, and both $R_2$ and $R_3$ along with atoms to which $R_2$ and $R_3$ are attached jointly form a moiety of formula (II), wherein $X_5$ and $X_6$ are each independently oxygen.

4. The nonaqueous electrolyte additive according to claim 1, characterized by that, the counter cation is a metal cation or a quaternary amine group.

5. The nonaqueous electrolyte additive according to claim 4, characterized by that, the metal cation is selected from lithium ion, sodium ion, potassium ion, calcium ion, magnesium ion and a combination thereof;

the quaternary amine group is selected from tetramethylamine, tetraethylamine, tetrapropylamine, and tetrabutylamine.

6. The nonaqueous electrolyte additive according to claim 1, characterized by that, the compound represented by formula (I) is selected from

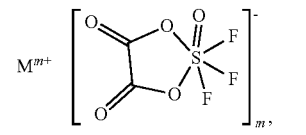

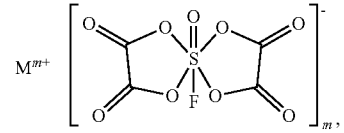

and a combination thereof, wherein $M^{m+}$ is a metal cation or a quaternary amine group, m is an integer of 1-3.

7. The nonaqueous electrolyte additive according to claim 1, characterized by that, the compound represented by formula (I) is selected from

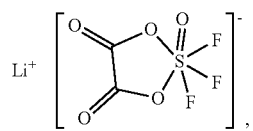

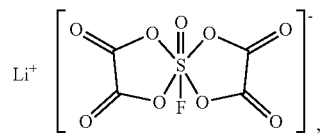

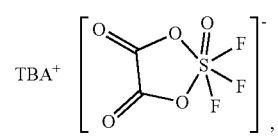

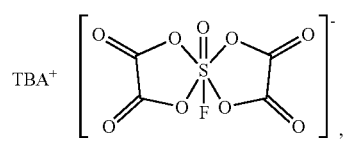

and a combination thereof.

8. A nonaqueous electrolyte comprising the nonaqueous electrolyte additive according to claim 1.

9. The nonaqueous electrolyte according to claim 8, characterized by that, based on a total weight of the nonaqueous electrolyte, a content of the compound represented by formula (I) in the nonaqueous electrolyte is 0.1-10 wt %.

10. The nonaqueous electrolyte according to claim 8, characterized by that, the nonaqueous electrolyte further comprises a nonaqueous solvent, wherein the nonaqueous solvent is selected from cyclic ester, chain ester, and a combination thereof;

the cyclic ester is a cyclic carbonate;

the chain ester is a chain carbonate.

11. The nonaqueous electrolyte according to claim 10, characterized by that, the cyclic carbonate is selected from ethylene carbonate, propylene carbonate, butylene carbonate, 1,2-butene carbonate, 2,3-butene carbonate, 4-fluoro-1,3-dioxolane-2-one, trans or cis 4,5-difluoro-1,3-dioxolane-2-one, fluoroethylene carbonate, vinylene carbonate, vinylethylene carbonate and combinations thereof.

12. The nonaqueous electrolyte according to claim 10, characterized by that the chain ester is selected from methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, ethyl methyl carbonate, methyl propyl carbonate, dimethyl carbonate, diethyl carbonate, ethyl propyl carbonate, dipropyl carbonate and a combination thereof.

13. The nonaqueous electrolyte according to claim 8, characterized by that,
the nonaqueous electrolyte further comprises a second lithium salt, which is selected from a lithium salt containing a P=O structure, a lithium salt containing a —S(=O)$_2$— structure, a lithium salt containing boron oxalate complex as an anion, and a combination thereof.

14. The nonaqueous electrolyte according to claim 13, further comprising a first lithium salt, wherein,
a total content of the first lithium salt and the second lithium salt is 10-20 wt %;
a content of the first lithium salt is 8-16 wt %.

15. The nonaqueous electrolyte according to claim 8, characterized by that the nonaqueous electrolyte also comprises one or more other additives selected from the following: vinylene carbonate, fluoroethylene carbonate, dimethyl carbonate, 1,3-propane sultone, ethylene sulfate, and propylene carbonate.

16. The nonaqueous electrolyte according to claim 15, characterized by that a total content of the other additive is 0-10 wt %.

17. A power storage device, characterized by that,
the power storage device comprises the nonaqueous electrolyte additive according to claim 1;
the power storage device is a secondary battery.

18. An electric device, characterized by that,
the electric device comprises the power storage device of claim 17;
the electric device is selected from a mobile vehicle, an electric two-wheeled vehicle, and a power storage system.

19. A power storage device, characterized by that,
the power storage device comprises the nonaqueous electrolyte according to claim 8;
the power storage device is a secondary battery.

20. An electric device, characterized by that,
the electric device comprises the power storage device of claim 19;
the electric device is selected from a mobile vehicle, an electric two-wheeled vehicle, and a power storage system.

* * * * *